US011656761B2

(12) United States Patent
Wang

(10) Patent No.: US 11,656,761 B2
(45) Date of Patent: May 23, 2023

(54) TOUCH HOTSPOT ADJUSTMENT METHOD, APPARATUS, AND DEVICE, AND TOUCHSCREEN TERMINAL DEVICE

(71) Applicant: Huawei Technologies Co., Ltd., Shenzhen (CN)

(72) Inventor: Long Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 16/961,532

(22) PCT Filed: Jan. 3, 2019

(86) PCT No.: PCT/CN2019/070187
§ 371 (c)(1),
(2) Date: Jul. 10, 2020

(87) PCT Pub. No.: WO2019/137287
PCT Pub. Date: Jul. 18, 2019

(65) Prior Publication Data
US 2020/0356266 A1 Nov. 12, 2020

(30) Foreign Application Priority Data

Jan. 10, 2018 (CN) .......................... 201810023873.2

(51) Int. Cl.
G06F 3/048 (2013.01)
G06F 3/04886 (2022.01)
G06F 3/041 (2006.01)
G06F 3/04817 (2022.01)

(52) U.S. Cl.
CPC ........ *G06F 3/04886* (2013.01); *G06F 3/0418* (2013.01); *G06F 3/04817* (2013.01)

(58) Field of Classification Search
None
See application file for complete search history.

(56) References Cited

U.S. PATENT DOCUMENTS 7,304,638 B2 12/2007 Murphy
2012/0036468 A1* 2/2012 Colley ................ G06F 3/04186
715/773
2013/0201155 A1* 8/2013 Wu ......................... G06F 3/044
345/173

(Continued)

FOREIGN PATENT DOCUMENTS

CN 104423864 A 3/2015
CN 105677213 A 6/2016

(Continued)

*Primary Examiner* — William C Trapanese
(74) *Attorney, Agent, or Firm* — Leydig, Voit & Mayer, Ltd.

(57) ABSTRACT

A method for adjusting a touch hotspot of a terminal is provided. The method includes: obtaining touch point coordinates of touch actions received in a at least one predetermined time period; determining at least one effective coordinate point from the touch point coordinates; selecting, from the touch point coordinates, at least one deviated coordinate point associated with the application icon; and adjusting current hotspot of an application icon based on the at least one deviated coordinate point of the application icon to obtain a new hotspot of the application icon, where the new hotspot includes the current hotspot.

19 Claims, 10 Drawing Sheets

(56) References Cited

U.S. PATENT DOCUMENTS

| | | | | |
|---|---|---|---|---|
| 2013/0222247 | A1* | 8/2013 | Liu | G06F 3/04886 |
| | | | | 345/168 |
| 2015/0186340 | A1 | 7/2015 | Liu et al. | |
| 2015/0378510 | A1* | 12/2015 | Cheong | G06F 3/0488 |
| | | | | 345/178 |
| 2017/0185287 | A1* | 6/2017 | Unruh | G06F 3/041 |

FOREIGN PATENT DOCUMENTS

| | | | |
|---|---|---|---|
| CN | 103207691 B | 8/2016 | |
| CN | 107357487 A | 11/2017 | |

\* cited by examiner

TOUCH HOTSPOT ADJUSTMENT METHOD, APPARATUS, AND DEVICE, AND TOUCHSCREEN TERMINAL DEVICE

CROSS-REFERENCE TO RELATED APPLICATIONS

This application is a National Stage of International Application No. PCT/CN2019/070187, filed on Jan. 3, 2019, which claims priority to Chinese Patent Application No. 201810023873.2, filed on Jan. 10, 2018. Both of the aforementioned applications are hereby incorporated by reference in their entireties.

TECHNICAL FIELD

This application relates to the field of communications technologies and, in particular, to a touch hotspot adjustment method and apparatus, and a terminal device.

BACKGROUND

A hotspot is a region defined with a link on a web page or an application. For example, a laid-out page (i.e., a landing page) looking like a whole image actually contains different linked regions as seen in the background. These linked regions are hotspots. An electronic map of China, for instance, contains many hotspot regions each linked to a designated location.

Hotspots are defined when an application or a web page is being built. At present, hotspots of all application icons are static ones, and most terminal devices are designed with touchscreens. Because sizes of finger touch areas and use habits of users vary, it is hard for uniform hotspots to meet needs of all users. This is particularly true for smaller-sized terminals on which accurate touching is even harder, resulting in a higher touch error rate.

SUMMARY

This application provides a touch hotspot adjustment method, apparatus, and device, and a touchscreen terminal device that enable dynamic hotspot adjustment, so as to effectively improve accuracy of touch actions on an application icon.

According to a first aspect, this application provides a touch hotspot adjustment method, including: obtaining touch point coordinates of touch actions received in a predetermined time period; determining an effective coordinate point from the touch point coordinates, where the effective coordinate point is a touch point within a current hotspot of an application icon whose link page is displayed for a time longer than a first predetermined time; selecting, from the touch point coordinates, a deviated coordinate point pertaining to the same application icon as the effective coordinate point, where the deviated coordinate point is a touch point recorded before the corresponding effective coordinate point, and a time difference between recording of the deviated coordinate point and the recoding of the corresponding effective coordinate point is than a predetermined time difference; and adjusting the current hotspot of the application icon based on all deviated coordinate points of the application icon to obtain a new hotspot of the application icon, where the new hotspot includes the current hotspot.

In this application, deviated coordinate points pertaining to the application icon are selected from all the touch point coordinates obtained in the predetermined time period, and the current hotspot is adjusted dynamically based on the deviated coordinate points. The new hotspot resulting from the adjustment better fits an actual operation region of a terminal device user, effectively reducing a touch error rate of the application icon.

With reference to the first aspect, in a first implementation of the first aspect, before the adjusting the current hotspot of the application icon based on all deviated coordinate points of the application icon to obtain a new hotspot of the application icon, the method further includes: determining that a distance between the deviated coordinate point and the current hotspot is less than a predetermined distance.

In this application, the determining that a distance between the deviated coordinate point and the current hotspot is less than a predetermined distance can effectively avoid an excessively large hotspot resulting from the adjustment because of just a few deviated coordinate points that have an excessively large distance to the current hotspot.

With reference to the first aspect, in a second implementation of the first aspect, before the adjusting the current hotspot of the application icon based on all deviated coordinate points of the application icon to obtain a new hotspot of the application icon, the method further includes: determining that a quantity of all effective coordinate points of the application icon within the predetermined time period is larger than a predetermined value.

In this application, the determining that a quantity of all effective coordinate points of the application icon within the predetermined time period is larger than a predetermined value allows adjustment of only current hotspots of application icons that are relatively frequently used by a user.

With reference to the first aspect, in a third implementation of the first aspect, the adjusting the current hotspot of the application icon based on all deviated coordinate points of the application icon to obtain a new hotspot of the application icon includes: connecting, according to a predefined rule for connecting a deviated coordinate point to a current hotspot, all the deviated coordinate points of the application icon to the current hotspot of the application icon to obtain the new hotspot of the application icon.

With reference to the first aspect, in a fourth implementation of the first aspect, if a quantity of all the deviated coordinate points of the application icon is not less than three, the adjusting the current hotspot of the application icon based on all deviated coordinate points of the application icon to obtain a new hotspot of the application icon includes: connecting all the deviated coordinate points with straight lines to obtain the largest region among all possible regions based on all the deviated coordinate points connected using the one or more straight lines; and obtaining the new hotspot of the application icon based on the largest region and the current hotspot of the application icon, where the new hotspot includes the largest region and the current hotspot of the application icon.

With reference to the first aspect, in a fifth implementation of the first aspect, the obtaining the new hotspot of the application icon based on the largest region and the current hotspot of the application icon includes: combining the largest region and the current hotspot of the application icon, and determining a region resulting from the combination as the new hotspot of the application icon.

With reference to the first aspect, in a sixth implementation of the first aspect, after the adjusting the current hotspot of the application icon based on all deviated coordinate points of the application icon to obtain a new hotspot of the application icon, the method further includes: if the new hotspot is beyond a predetermined region, determining a region of the new hotspot within the predetermined region as a new hotspot of the application icon.

In this application, predetermined regions are defined such that hotspots of all application icons are controllable. Overlapping of hotspots of different application icons is thereby avoided, and opening an incorrect application icon because of such overlapping is prevented.

With reference to the first aspect, in a seventh implementation of the first aspect, after touch point coordinates of touch actions received in N predetermined time periods are obtained, where N≥2, the method further includes: adjusting an original hotspot of the application icon based on all deviated coordinate points of the application icon recorded in the N predetermined time periods, to obtain a new hotspot of the application icon, where the original hotspot is a hotspot defined at generation of the application icon.

With reference to first aspect, in an eighth implementation of the first aspect, after the adjusting the current hotspot of the application icon based on all deviated coordinate points of the application icon to obtain a new hotspot of the application icon, the method further includes: if a quantity of effective coordinate points of the application icon among touch point coordinates recorded in a second predetermined time period is zero, resuming an original hotspot of the application icon to substitute for the new hotspot of the application icon, where the original hotspot is a hotspot defined at generation of the application icon.

According a second aspect, this application provides a touch hotspot adjustment apparatus, including: a touch point coordinate obtaining module, configured to obtain touch point coordinates of touch actions received in a predetermined time period; an effective coordinate determining module, configured to determine an effective coordinate point from the touch point coordinates, where the effective coordinate point is a touch point within a current hotspot of an application icon whose link page is displayed for a time longer than a first predetermined time; a deviated coordinate selecting module, configured to select, from the touch point coordinates, a deviated coordinate point pertaining to the same application icon as the effective coordinate point, where the deviated coordinate point is a touch point recorded before the corresponding effective coordinate point, and a time difference between recording of the deviated coordinate point and the recording of the corresponding effective coordinate point is less than a predetermined time difference; and a hotspot adjustment module, configured to adjust the current hotspot of the application icon based on all deviated coordinate points of the application icon to obtain a new hotspot of the application icon, where the new hotspot includes the current hotspot.

With reference to the second aspect, in a first implementation of the second aspect, the adjustment apparatus further includes a deviated coordinate screening module, configured to: before the current hotspot of the application icon is adjusted based on all the deviated coordinate points of the application icon to obtain the new hotspot, determine that a distance between the deviated coordinate point and the current hotspot is less than a predetermined distance.

With reference to the second in a first implementation of the second aspect, the adjustment apparatus further includes a frequency determining module, configured to: before the current hotspot of the application icon is adjusted based on all the deviated coordinate points of the application icon to obtain the new hotspot, determine that a quantity of all effective coordinate points of the application icon within the predetermined time period is larger than a predetermined value.

With reference to the second aspect, in a third implementation of the second aspect, the hotspot adjustment module is specifically configured to connect, according to a predefined rule for connecting a deviated coordinate point to a current hotspot, all the deviated coordinate points of the application icon to the current hotspot of the application icon to obtain the new hotspot of the application icon.

With reference to the second aspect, in a fourth embodiment of the second aspect, if a quantity of all the deviated coordinate points of the application icon is not less than three, the hotspot adjustment module is specifically configured to: connect all the deviated coordinate points with straight lines to obtain the largest region among all possible regions based on all the deviated coordinate points connected using the one or more straight lines; and obtain the new hotspot of the application icon based on the largest region and the current hotspot of the application icon, where the new hotspot includes the largest region and the current hotspot of the application icon.

With reference to the second aspect, in a fifth embodiment of the second aspect, the hotspot adjustment module is specifically configured to combine the largest region and the current hotspot of the application icon, and determine a region resulting from the combination as the new hotspot of the application icon.

With reference to the second aspect, in a sixth implementation of the second aspect, the adjustment apparatus further includes a hotspot correction module, configured to: after the current hotspot of the application icon is adjusted based on all the deviated coordinate points of the application icon to obtain the new hotspot of the application icon, if the new hotspot is beyond a predetermined region, determine a region of the new hotspot within the predetermined region as a new hotspot of the application icon.

With reference to the second aspect, in a seventh implementation of the second aspect, the hotspot adjustment module is further configured to: after touch point coordinates of touch actions received in N predetermined time periods are obtained, adjust an original hotspot of the application icon based on all deviated coordinate points of the application icon recorded in the N predetermined time periods, to obtain a new hotspot of the application icon, where the original hotspot is a hotspot defined at generation of the application icon, and N≥2.

With reference to the second aspect, in an eighth implementation of the second aspect, the hotspot adjustment module is further configured to: after the current hotspot of the application icon is adjusted based on all the deviated coordinate points of the application icon to obtain the new hotspot of the application icon, if a quantity of effective coordinate points of the application icon among touch point coordinates recorded in a second predetermined time period is zero, resume an original hotspot of the application icon to substitute for the new hotspot of the application icon, where the original hotspot is a hotspot defined at generation of the application icon.

According to a third aspect, this application provides a touchscreen terminal device, including a touchscreen and the touch hotspot adjustment apparatus according to any one of the second aspect and the implementations of the second aspect, where the touchscreen is connected to the adjustment apparatus and configured to display application icons, receive touch actions, generate touch point coordinates of the touch actions, and send the touch point coordinates to the adjustment apparatus.

According to a fourth aspect, this application provides a touch hotspot adjustment device that includes a processor and a memory, where the memory is configured to store computer program code; and the processor is configured to execute computer program code stored in the memory to implement the adjustment method according to any one of the first aspect and the implementations of the first aspect.

According to a fifth aspect, this application provides a computer-readable storage medium, where the readable storage medium stores an instruction, and when the instruction is run on a computer, the computer is enabled to execute the adjustment method according to any one of the first aspect and the implementations of the first aspect.

According to a sixth aspect, this application provides a computer program product that includes an instruction, where, when the instruction of the computer program product is run on a computer, the computer is enabled to execute the adjustment method according to any one of the first aspect and the implementations of the first aspect.

According to a seventh aspect, this application provides a computer program, where, when the computer program is run on a computer, the computer is enabled to execute the adjustment method according to any one of the first aspect and the implementations of the first aspect.

DESCRIPTION OF EMBODIMENTS

The touch hotspot adjustment method of the embodiments of the present invention is applicable to adjustment of hotspots of application icons on touchscreen terminal devices. The touchscreen terminal devices include but are not limited to smartphones, tablet computers, and the like.

Figure 1:
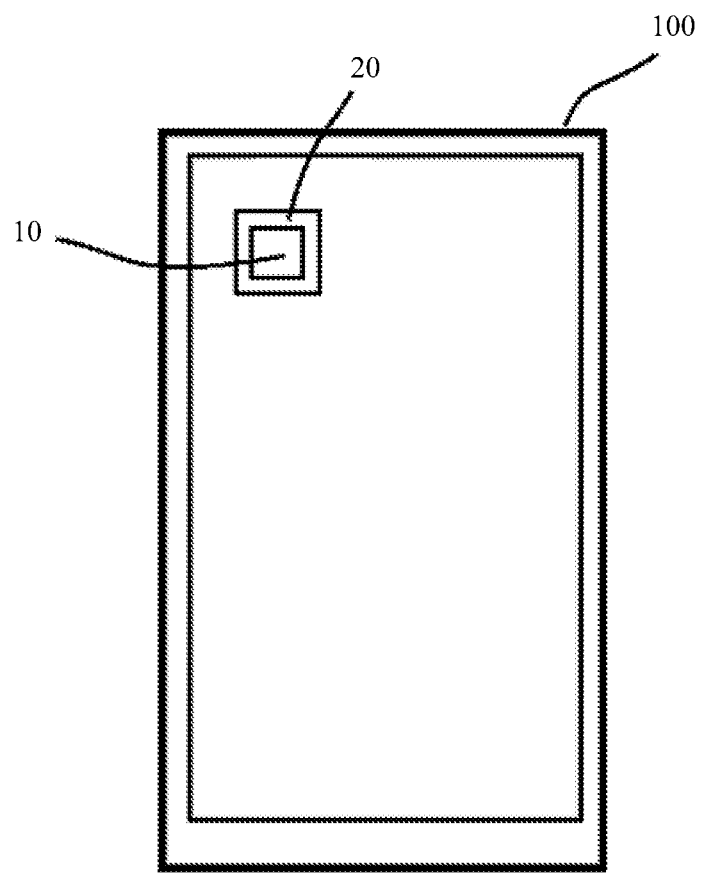
FIG. 1 is a schematic diagram of a touchscreen terminal device to which an embodiment of the present invention is applicable.
Figure 2:
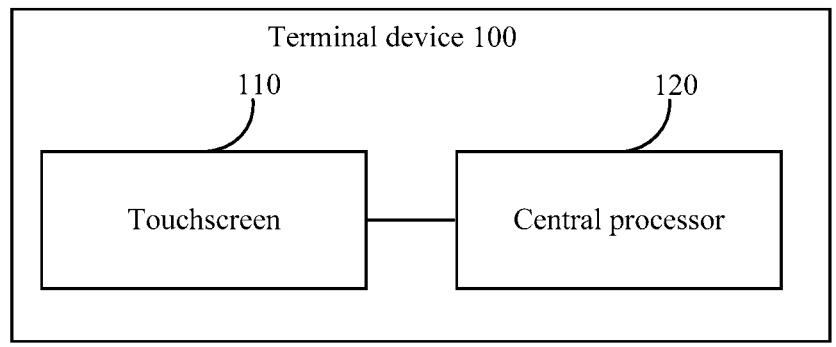
FIG. 2 is a schematic block diagram of a touchscreen terminal device to which an embodiment of the present invention is applicable.

FIG. 1 is a schematic diagram of a touchscreen terminal device 100 to which an embodiment of the present invention is applicable. The touchscreen terminal device 100 may specifically be a smartphone. FIG. 2 is a schematic structural block diagram of the touchscreen terminal device 100 shown in FIG. 1. As shown in FIG. 1 and FIG. 2, the touchscreen terminal device 100 may include a touchscreen 110 and a central processor 120. The touchscreen 110 displays an application icon 10, of which a schematic current hotspot 20 is shown in FIG. 1 (in practice, hotspots are not visualized).

When a user touches the application 10 displayed on the touchscreen terminal device 100, the touchscreen 110 detects the touch to obtain touch point coordinates, and sends the touch point coordinates to the central processor 120. The central processor 120 receives the touch point coordinates sent by the touchscreen 110. The central processor 110 analyzes all touch point coordinates received in a predetermined time period to determine a deviated coordinate point of the application 10, and adjusts the current hotspot 20 of the application icon 10 based on the deviated coordinate point. A new hotspot resulting from the adjustment better fits an actual operation region of the user, improving accuracy of touch operations of the user on the application icon.

It should be noted that the application icon in the embodiments of the present invention may be any form of icon provided with a hotspot whose application link page can be visited through a touch on the hotspot. The application icon may be an icon in a form of computer graphics on the terminal device, or an application icon displayed as various signs, for example, the Contacts application icon or a widget, or a digit icon on a dial keyboard of which each digit may be considered as an application icon whose link page is a page displayed corresponding to the digit.

Figure 3:
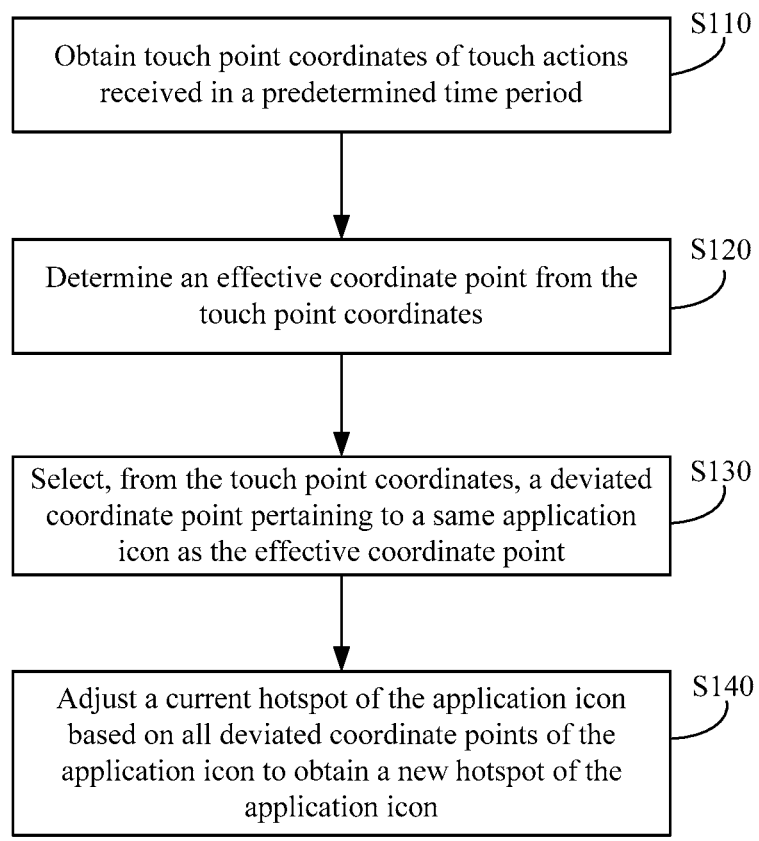
FIG. 3 is a schematic flowchart of a touch hotspot adjustment method according to an embodiment of the present invention.

FIG. 3 is a schematic flowchart of a touch hotspot adjustment method according to an embodiment of the present invention. The adjustment method may specifically be executed by the central processor 120 shown in FIG. 2. The central processor 120 is connected to the touchscreen 110 and configured to receive touch point coordinates of touch actions sent by the touchscreen 110.

As shown in FIG. 3, the touch hotspot adjustment method according to the embodiment of the present invention includes the following steps.

Step S110: Obtain touch point coordinates of touch actions received in a predetermined time period.

In practice, because different users have different finger contact areas, different use habits, and different touch accuracy, when a user touches an application icon displayed on the touchscreen, a touch point of the touch action is possibly within or beyond a hotspot of the application icon. If the touch point is within the hotspot of the application icon, the processor controls the link page of the application icon to be opened and displayed on the touchscreen. If the touch point is beyond the hotspot of the application icon, the link page of the application icon is not opened.

In this embodiment of the present invention, touch actions received in the predetermined time period include touch actions for which the link page of the application icon is opened and touch actions for which the link page of the application icon is not opened. Accordingly, the recorded touch point coordinates include coordinates of touch points within the hotspot of the application icon and coordinates of touch points beyond the hotspot of the application icon.

It can be understood that the predetermined time period may be specified as required, for example, being set to one or more days. A longer predetermined time means obtaining of coordinates of more touch points, more coordinate points for adjustment of the current hotspot, and eventually a resulting new hotspot whose region better fits an actual operation region of the user.

Step S120: Determine an effective coordinate point from the touch point coordinates.

Step S130: Select, from the touch point coordinates, a deviated coordinate point pertaining to a same application icon as the effective coordinate point.

The effective coordinate point is a touch point within a current hotspot of the application icon whose link page is displayed for a time longer than a first predetermined time. In this embodiment of the present invention, effective coordinates are coordinates identifying a touch point of an accurate touch action of the user, or, in other words, coordinates of a touch point falling within a current hotspot of an application icon truly intended by the user.

The deviated coordinate point is a touch point recorded before the corresponding effective coordinate point, and a time difference between recording of the deviated coordinate point and the recoding of the corresponding effective coordinate point is less than a predetermined time difference. In this embodiment of the present invention, deviated coordinates are relative to effective coordinates and refer to touch point coordinates of a touch action with an inaccurate touch point performed before a touch point of a touch action falls within the current hotspot of an application icon intended by the user, that is, touch point coordinates of an erroneous touch. In practice, erroneous touches are generally short in time. Therefore, a time length between when a deviated coordinate point is recorded and when its corresponding effective coordinate point is recorded is generally less than a predetermined time difference. Therefore, a deviated coordinate point corresponding to an effective coordinate point is a deviated coordinate point pertaining to a same application icon as the effective coordinate point, and refers to touch point coordinates recorded before the effective coordinate point, where a time difference between when the deviated coordinate point is recorded and when the effective coordinate point is recorded is less than the predetermined time difference.

A touch point of a touch action falling within a hotspot of an application icon indicates that the current touch action can lead to a page linked to the hotspot, that is, a link page of the application icon. In practice, however, when a touch point falls within a hotspot of an application icon, the application icon is possibly an application icon truly intended by the user, or an application icon touched by mistake because of inaccurate touching when the user intends to tap another application icon nearby. Normally, if the link page is truly intended by the user, the page is displayed for a considerable length of time; if the link page is opened by mistake, the user quickly exits the link page and performs another touch action on the intended application icon until a touch point falls with the hotspot of the application icon. Therefore, when a touch point falls within a current hotspot of an application icon, it is practical to determine whether the touch point is an effective coordinate point by considering whether a link page of the application icon is displayed for a time longer than a first predetermined time.

In this embodiment of the present invention, a quantity of effective coordinate points among the touch point coordinates is determined by actual touch actions of the user in the predetermined time period. In the predetermined time period, the user may operate a plurality of application icons and may open one application icon for more than once. Therefore, the touch point coordinates may include effective coordinate points of a plurality of application icons, and for one application icon, there may be a plurality of effective coordinate points.

Step S140: Adjust the current hotspot of the application icon based on all deviated coordinate points of the application icon to obtain a new hotspot of the application icon, where the new hotspot includes the current hotspot.

It can be understood that, in this embodiment of the present invention, the adjusting the current hotspot of the application icon based on all deviated coordinate points of the application icon is meant for one application icon, and the adjusting is on a current hotspot of this application icon based on all deviated coordinate points of the application icon. If a plurality of application icons are operated in the predetermined time period, current hotspots of the plurality of application icons are each adjusted based on all deviated coordinate points of each of the plurality of application icons.

It should be noted that, in this embodiment of the present invention, the current hotspot is so termed as to merely distinguish from the new hotspot resulting from the adjustment.

As described above, the user may operate one application icon for more than once in the predetermined time period. Therefore, among the touch point coordinates, there may be a plurality of effective coordinate points pertaining to one application icon. Accordingly, all deviated coordinate points of this application icon include deviated coordinate points corresponding to a plurality of effective coordinate points. For example, an application icon A corresponds to an application frequently used by the user. In the predetermined time period (for example, one day), the user operates the application icon for seven times. Therefore, among touch point coordinates, there are seven effective coordinate points pertaining to the application icon, and all deviated coordinate points corresponding to the seven effective coordinate points are all deviated coordinate points of the application icon in the predetermined time period. It can be understood that it is practical to determine whether a plurality of effective coordinate points are pertaining to one application icon according to whether a same application icon link page is opened for the plurality of effective coordinate points.

In this embodiment of the present invention, the current hotspot of the application icon is dynamically adjusted based on all the deviated coordinate points of the application icon in the predetermined time period. Because the deviated coordinate points are obtained based on actual touch actions of the user, the new hotspot resulting from the adjustment better fits the actual operation region of the user of the touchscreen terminal device. Therefore, accuracy of touch actions on the application icon can be effectively improved, reducing incidence of erroneous touches, especially for smaller-sized touchscreen terminal devices.

It can be understood that, in practice, when a current hotspot of an application icon is adjusted based on all deviated coordinate points of the application icon, different adjustment schemes may be selected depending on types of touchscreen terminal devices, sizes of touchscreens, or actual application requirements.

In an optional embodiment of the present invention, before the adjusting the current hotspot of the application icon based on all deviated coordinate points of the application icon to obtain a new hotspot of the application icon, the method may further include:

determining that a distance between the deviated coordinate point and the current hotspot is less than a predetermined distance.

In this embodiment of the present invention, before the current hotspot of the application icon is adjusted, it is determined that the distance between the deviated coordinate point used for adjustment of the current hotspot and the current hotpot is less than the predetermined distance. This further screens the deviated coordinate points, eliminating deviated coordinate points whose distance to the current hotspot is excessively large. When a distance between a deviated coordinate point and the current hotspot is excessively large, the hotspot resulting from the adjustment is excessively large and may overlap another hotspot. As a result, when a touch action takes place in an overlap region, the processor is unable to determine for which application icon it should open a link page, in which case an error may occur. With this embodiment of the present invention, incidence of such errors can be avoided.

In an optional embodiment of the present invention, before the adjusting the current hotspot of the application icon based on all deviated coordinate points of the application icon to obtain a new hotspot of the application icon, the method further includes:

determining that a quantity of all effective coordinate points of the application icon within the predetermined time period is larger than a predetermined value.

Whether the quantity of effective coordinate points is larger than the predetermined value means whether a quantity of times that the same application icon is operated in the predetermined time period is larger than the predetermined value. Therefore, before the current hotspot is adjusted, it is determined whether the quantity of all effective coordinate points of the application icon is larger than the predetermined value so as to determine whether to adjust the current hotspot of the application icon. In this way, only current hotspots of application icons that are relatively frequently operated by the user are adjusted, while a hotspot of an application icon that is not frequently used by the user is not adjusted. Computing resources of the device are saved.

It can be understood that the predetermined value may be set based on actual application requirements and the predetermined time period. A magnitude of the predetermined value is in direct proportion to the predetermined time period.

In an optional embodiment of the present invention, the adjusting the current hotspot of the application icon based on all deviated coordinate points of the application icon to obtain a new hotspot of the application icon includes:

connecting, according to a predefined rule for connecting a deviated coordinate point to a current hotspot, all the deviated coordinate points of the application icon to the current hotspot of the application icon to obtain the new hotspot of the application icon.

Figure 4:
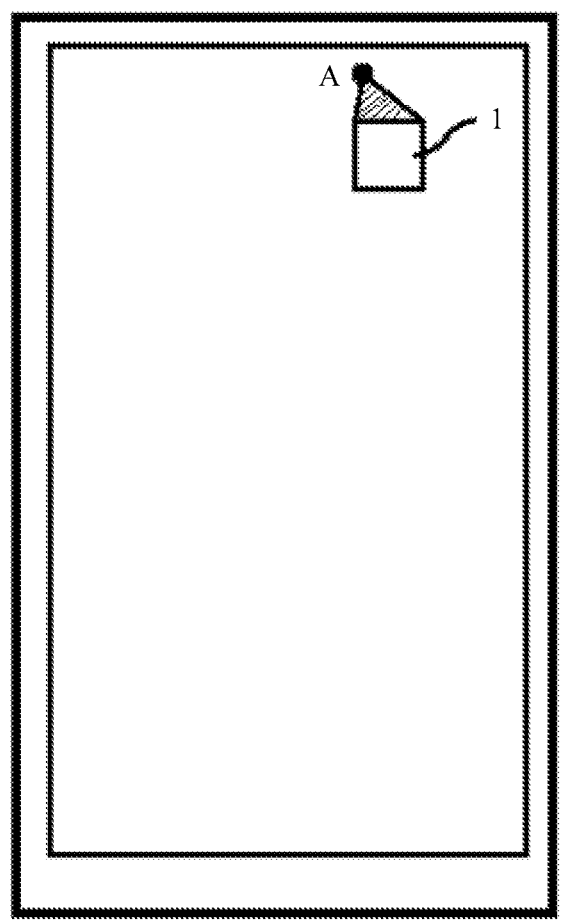
FIG. 4 is a schematic diagram of a new hotspot of an application icon according to an embodiment of the present invention.

FIG. 4 is a schematic diagram illustrating connections of a deviated coordinate point to a current hotspot of an application icon according to a specific embodiment of the present invention. In this specific embodiment, a current hotspot 1 takes up a rectangle region, and there is only one deviated coordinate point A. A preset rule for connecting a deviated coordinate point to a current hotspot reads that a deviated coordinate point is connected to two vertexes of a hotspot nearest to the deviated coordinate point. According to this connecting rule, the deviated coordinate point is connected to the application icon as shown in FIG. 4. A new hotspot of the application icon may include the current hotspot 1 and a region filled with slanted lines enclosed by lines connecting the deviated coordinate point A and the current hotspot 1.

In an optional embodiment of the present invention, if a quantity of all the deviated coordinate points is not less than three, the adjusting the current hotspot of the application icon based on all deviated coordinate points of the application icon to obtain a new hotspot of the application icon includes:

connecting all the deviated coordinate points with straight lines to obtain the largest region among all possible regions based on all the deviated coordinate points connected using the one or more straight lines; and obtaining the new hotspot of the application icon based on the largest region and the current hotspot of the application icon, where the new hotspot includes the largest region and the current hotspot of the application icon.

Connecting three different points can produce a plane. Therefore, when the quantity of deviated coordinate points in not less than three, all the deviated coordinate points may be connected with straight lines to obtain the largest region. Then, the new hotspot of the application icon can be obtained based on the largest region and the current hotspot of the application icon. In this way, the new hotspot is larger than the current hotspot, so that accuracy of touch actions can be effectively improved with a lower touch error rate.

In an optional embodiment of the present invention, the obtaining the new hotspot of the application icon based on the largest region and the current hotspot of the application icon includes:

combining the largest region and the current hotspot of the application icon, and determining a region resulting from the combination as the new hotspot of the application icon.

Figure 5:
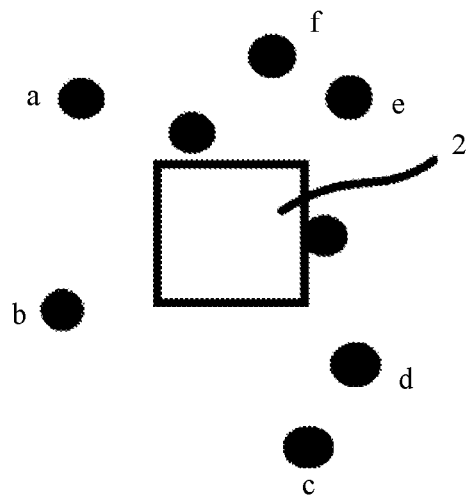
FIG. 5 is a schematic diagram of deviated coordinate points of an application icon according to an embodiment of the present invention.
Figure 6:
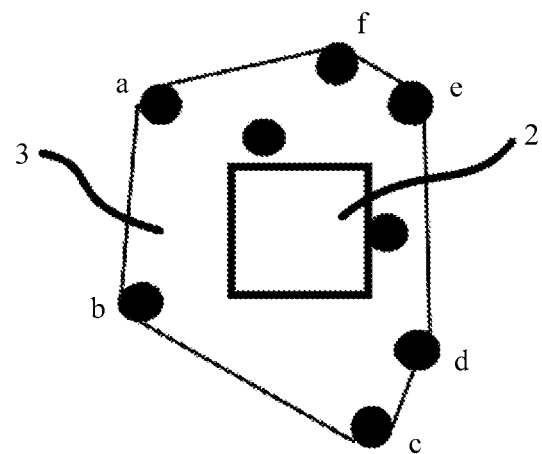
FIG. 6 is a schematic diagram of the largest region obtained based on the deviated coordinate points shown in FIG. 5.
Figure 7:
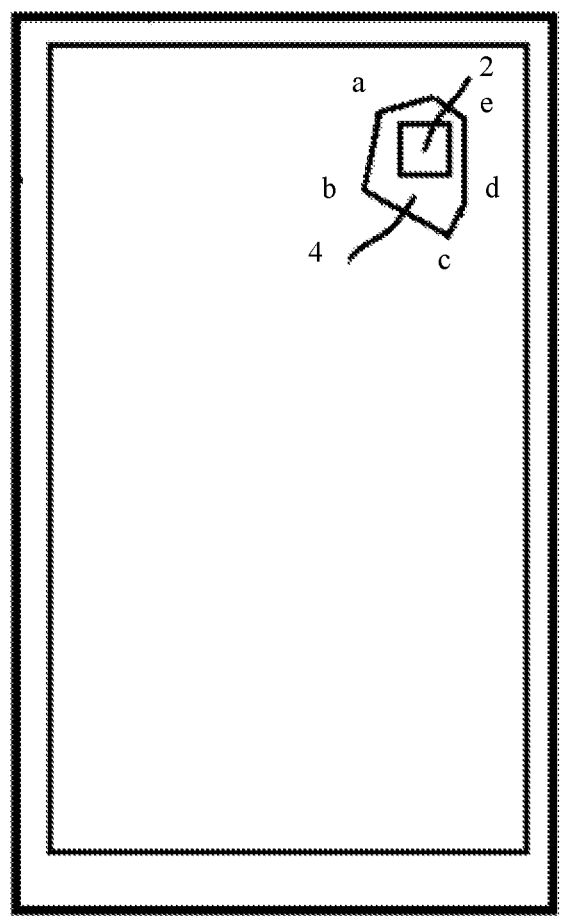
FIG. 7 is a schematic diagram of a new hotspot of an application icon according to another embodiment of the present invention.

FIG. 5, FIG. 6, and FIG. 7 are schematic diagrams illustrating adjustment of a current hotspot of an application icon based on all deviated coordinate points of the application icon to obtain a new hotspot of the application icon, according to an embodiment of the present invention. FIG. 5 and FIG. 6 are schematic diagrams illustrating the deviated coordinate points and the current hotspot that are enlarged, in which black circles represent all the deviated coordinate points of the application icon. According to FIG. 5 and FIG. 6, it is obvious that a quantity of deviated coordinate points is larger than three. The largest region resulting from connecting all the deviated coordinate points with straight lines is a region 3 formed by connecting six deviated coordinate points: a, b, c, d, e, and f. The region 3 and a current hotspot 2 are combined to form a new hotspot of the application icon (not shown), where the new hotspot is a hotspot 4 shown in FIG. 7.

Figure 8:
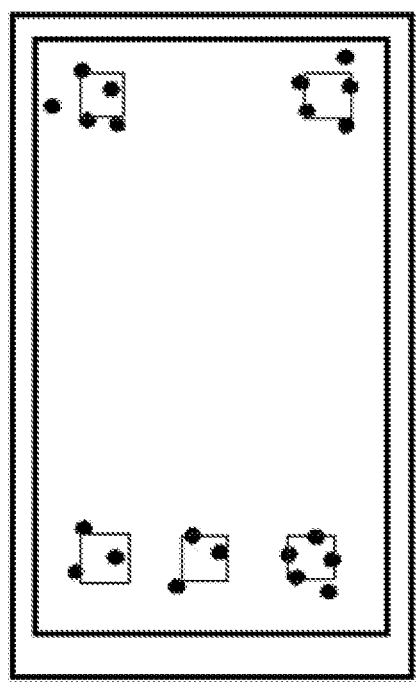
FIG. 8 is a schematic diagram of deviated coordinate points of application icons according to still another embodiment of the present invention.
Figure 9:
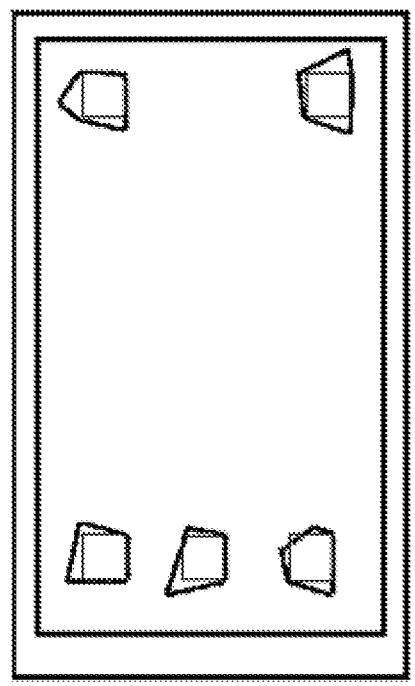
FIG. 9 is a schematic diagram of new hotspots resulting from adjustment for the application icons based on the deviated coordinate points shown in FIG. 8.

FIG. 8 and FIG. 9 are schematic diagrams illustrating adjustment of current hotspots of application icons based on all deviated coordinate points of the application icons to obtain new hotspots of the application icons, according to another embodiment of the present invention. As shown in FIG. 8, a user operates five application icons totally in a predetermined time period, and all deviated coordinate points of each application icon are presented by black circles. After a current hotspot of each application icon is adjusted based on all deviated coordinate points of each application icon, a new hotspot of each application icon is shown in FIG. 9. In FIG. 9, rectangle regions represent the current hotspots of the application icons, and polygonal regions represent the new hotspots.

From the embodiment shown in FIG. 5 to FIG. 7 and that shown in FIG. 8 and FIG. 9, it can be learned that the touch hotspot adjustment method of the embodiments of the present invention allows dynamic adjustment of a current hotspot of an application icon and a resulting new hotspot better fits an actual operation region of the terminal device user. This can effectively reduce incidence of inaccurate touching, making touch actions more accurate.

In an optional embodiment of the present invention, after the adjusting the current hotspot of the application icon based on all deviated coordinate points of the application icon to obtain a new hotspot of the application icon, the method further includes:

if the new hotspot is beyond a predetermined region, determining a region of the new hotspot within the predetermined region as a new hotspot of the application icon.

A touchscreen terminal device typically displays a plurality of application icons on each screen. Setting of the predetermined region avoids overlapping of hotspots of different application icons. When a touch point of a touch action of a user falls within an overlap region, the processor is unable to determine for which application icon it should open a link page, in which case an error may occur. With this embodiment of the present invention, incidence of such errors can be avoided.

In an optional embodiment of the present invention, after touch point coordinates of touch actions received in N predetermined time periods are obtained, where N≥2, the method further includes:

adjusting an original hotspot of the application icon based on all deviated coordinate points of the application icon recorded in the N predetermined time periods, to obtain a new hotspot of the application icon, where the original hotspot is a hotspot defined at generation of the application icon.

In this embodiment of the present invention, it is practical to adjust an original hotspot of an application icon after obtaining of touch point coordinates of at least two predetermined periods, based on all deviated coordinate points of the application icon in these periods. In this way, the new hotspot resulting from the adjustment better fits a long-time actual region of operation of the user.

In an optional embodiment of the present invention, after the adjusting the current hotspot of the application icon based on all deviated coordinate points of the application icon to obtain a new hotspot of the application icon, the method further includes:

if a quantity of effective coordinate points of the application icon among touch point coordinates recorded in a second predetermined time period is zero, resuming an original hotspot of the application icon to substitute for the new hotspot of the application icon, where the original hotspot is a hotspot defined at generation of the application icon.

That a quantity of effective coordinate points of the application icon among touch point coordinates recorded in a second predetermined time period is zero indicates that the user has carried out no operation on the application icon in this period of time. In this case, the original hotspot of the application icon may be resumed to substitute for the new hotspot, so as to reduce occupation of device resources by application icons not so frequently used.

It can be understood that the second predetermined time period may be set based on actual application requirements. For example, in an optional embodiment of the present invention, the second predetermined time period may be not less than the foregoing predetermined time period.

In the touch hotspot adjustment method in the embodiments of the present invention, touch point coordinates of touch actions of a user on a touchscreen recorded in a specific period of time, that is, the predetermined time period, are analyzed so as to determine a deviated touch point (a touch point of a touch action corresponding to deviated coordinates) of the user with respect to the application icon. Then, a current hotspot of the application icon is adjusted based on deviated coordinates of the deviated touch point. In this way, a new hotspot of the application icon resulting from the adjustment better fits an actual operation region of the terminal user, and touch actions on the application icon are more accurate.

Figure 10:
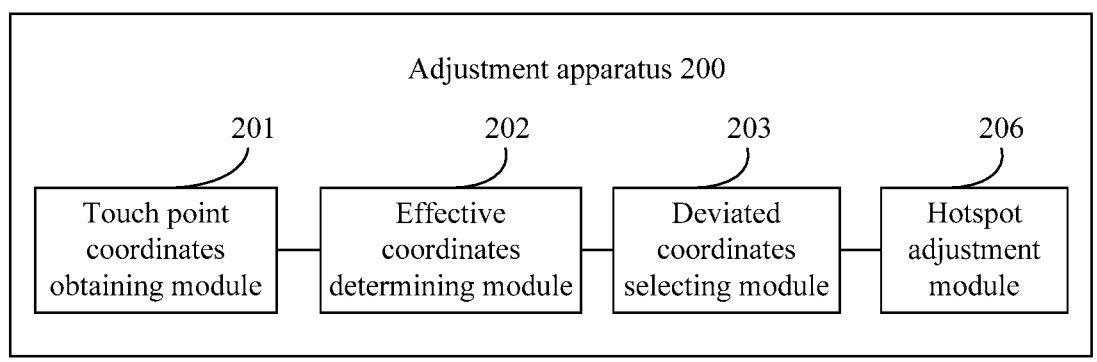
FIG. 10 is a schematic block diagram of a touch hotspot adjustment apparatus according to an embodiment of the present invention.

FIG. 10 is a schematic structural block diagram of a touch hotspot adjustment apparatus 200 according to an embodiment of the present invention. The adjustment apparatus may specifically be a processor. As shown in FIG. 10, the adjustment apparatus 200 may include a touch point coordinate obtaining module 201, an effective coordinate determining module 202, a deviated coordinate selecting module 203, and a hotspot adjustment module 206.

The touch point coordinate obtaining module 201 is configured to obtain touch point coordinates of touch actions received in a predetermined time period.

The effective coordinate determining module 202 is configured to determine an effective coordinate point from the touch point coordinates, where the effective coordinate point is a touch point within a current hotspot of an application icon whose link page is displayed for a time longer than a first predetermined time.

The deviated coordinate selecting module 203 is configured to select, from the touch point coordinates, a deviated coordinate point pertaining to the same application icon as the effective coordinate point, where the deviated coordinate point is a touch point recorded before the corresponding effective coordinate point, and a time difference between when the deviated coordinate point is recoded and when the corresponding effective coordinate point is recorded is less than a predetermined time difference.

The hotspot adjustment module 206 is configured to adjust the current hotspot of the application icon based on all deviated coordinate points of the application icon to obtain a new hotspot of the application icon, where the new hotspot includes the current hotspot.

It can be understood that the adjustment apparatus 200 in this embodiment of the present invention may correspond to an entity executing the touch hotspot adjustment method in the embodiments of the present invention, and that the operations and/or functions of the modules of the adjustment apparatus 200 are configured to implement corresponding processes of the adjustment method shown in FIG. 3, respectively. For brevity, no more details are described herein.

Figure 11:
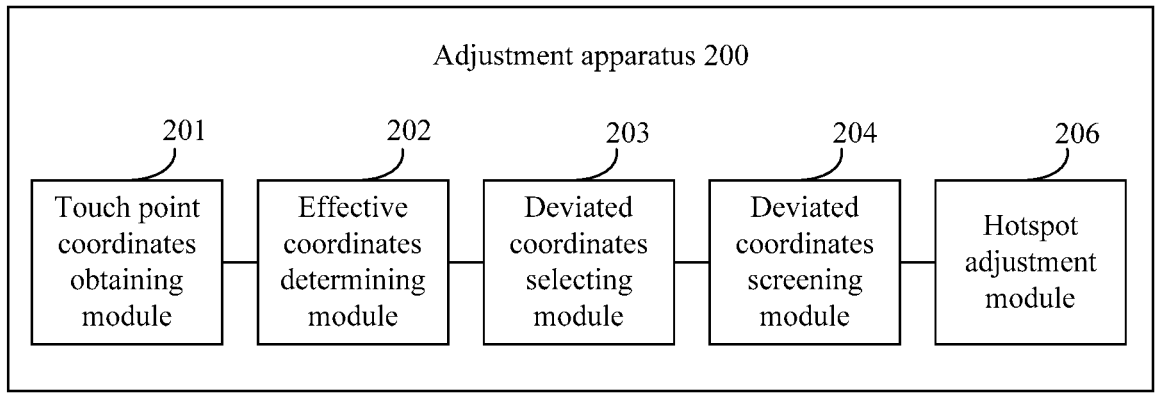
FIG. 11 is a schematic block diagram of a touch hotspot adjustment apparatus according to another embodiment of the present invention.

FIG. 11 is a schematic structural block diagram of a touch hotspot adjustment apparatus according to another embodiment of the present invention. As shown in FIG. 11, the adjustment apparatus 200 may further include a deviated coordinate screening module 204.

The deviated coordinate screening module 204 is configured to: before the current hotspot of the application icon is adjusted based on all the deviated coordinate points of the application icon to obtain the new hotspot, determine that a distance between the deviated coordinate point and the current hotspot is less than a predetermined distance.

Figure 12:
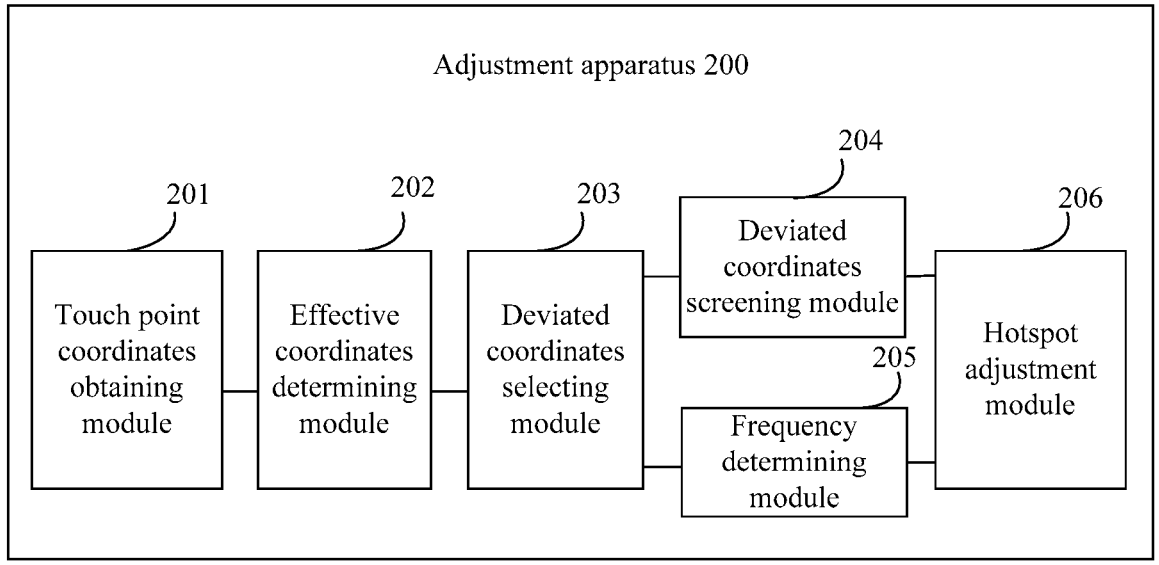
FIG. 12 is a schematic block diagram of a touch hotspot adjustment apparatus according to still another embodiment of the present invention.

FIG. 12 is a schematic structural block diagram of a touch hotspot adjustment apparatus according to still another embodiment of the present invention. As shown in FIG. 12, the adjustment apparatus 200 may further include a frequency determining module 205.

The frequency determining module 205 is configured to: before the current hotspot of the application icon is adjusted based on all the deviated coordinate points of the application icon to obtain the new hotspot, determine that a quantity of all effective coordinate points of the application icon within the predetermined time period is larger than a predetermined value.

In an optional embodiment of the present invention, the hotspot adjustment module 206 is specifically configured to:

connect, according to a predefined rule for connecting a deviated coordinate point to a current hotspot, all the deviated coordinate points of the application icon to the current hotspot of the application icon to obtain the new hotspot of the application icon.

In an optional embodiment of the present invention, if a quantity of all the deviated coordinate points of the application icon is not less than three, the hotspot adjustment module 206 is specifically configured to:

connect all the deviated coordinate points with straight lines to obtain the largest region among all possible regions based on the at least one deviated coordinate point connected using the one or more straight lines; and obtain the new hotspot of the application icon based on the largest region and the current hotspot of the application icon, where the new hotspot includes the largest region and the current hotspot of the application icon.

In an optional embodiment of the present invention, the hotspot adjustment module 206 is specifically configured to:

combine the largest region and the current hotspot of the application icon, and determine a region resulting from the combination as the new hotspot of the application icon.

Figure 13:
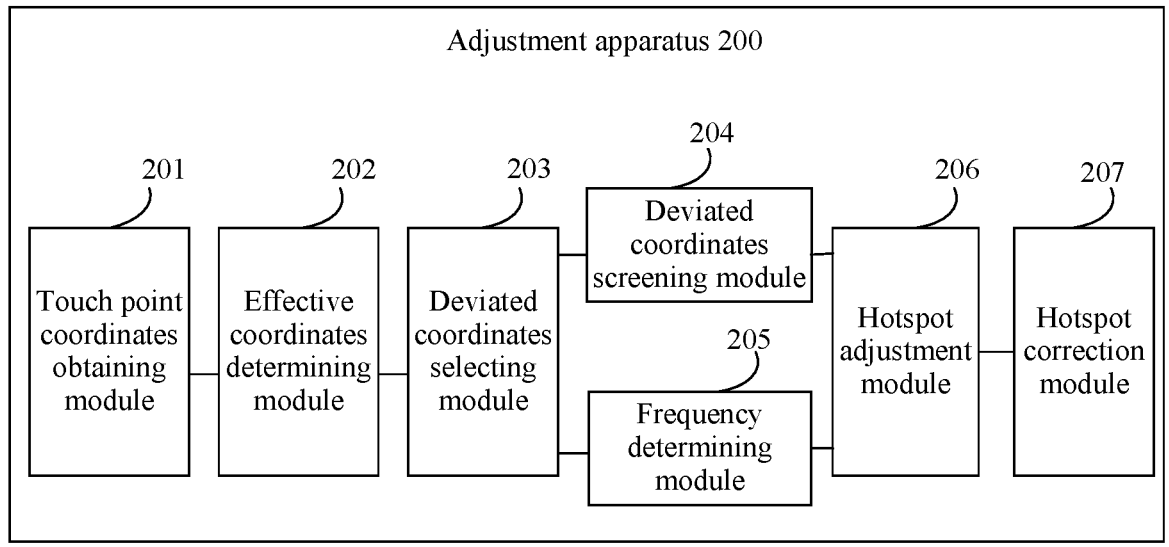
FIG. 13 is a schematic block diagram of a touch hotspot adjustment apparatus according to yet another embodiment of the present invention.

FIG. 13 is a schematic structural block diagram of a touch hotspot adjustment apparatus according to yet another embodiment of the present invention. As shown in FIG. 13, the adjustment apparatus 200 may further include a hotspot correction module 207.

The hotspot correction module 207 is configured to: after the current hotspot of the application icon is adjusted based on all the deviated coordinate points of the application icon to obtain the new hotspot of the application icon, if the new hotspot is beyond a predetermined region, determine a region of the new hotspot within the predetermined region as a new hotspot of the application icon.

In an optional embodiment of the present invention, the hotspot adjustment module 206 is further configured to: after touch point coordinates of touch actions received in N predetermined time periods are obtained, adjust an original hotspot of the application icon based on all deviated coordinate points of the application icon recorded in the N predetermined time periods, to obtain a new hotspot of the application icon, where the original hotspot is a hotspot defined at generation of the application icon, and N≥2.

In an optional embodiment of the present invention, the hotspot adjustment module 206 is further configured to: after the current hotspot of the application icon is adjusted based on all the deviated coordinate points of the application icon to obtain the new hotspot of the application icon, if a quantity of effective coordinate points of the application icon among touch point coordinates recorded in a second predetermined time period is zero, resume an original hotspot of the application icon to substitute for the new hotspot of the application icon, where the original hotspot is a hotspot defined at generation of the application icon.

It can be understood that the touch hotspot adjustment apparatus 200 in the embodiments of the present invention may correspond to an entity executing the touch hotspot adjustment method in the embodiments of the present invention, and that the operations and/or functions of the modules of the adjustment apparatus 200 are configured to implement corresponding processes of the touch hotspot adjustment method in the embodiments of the present invention, respectively. Therefore, for specific implementation of the operations and/or functions of the modules of the adjustment apparatus 200, reference may be made to the corresponding steps in the adjustment method in the embodiments of the present invention. For brevity, no more details are described herein.

Figure 14:
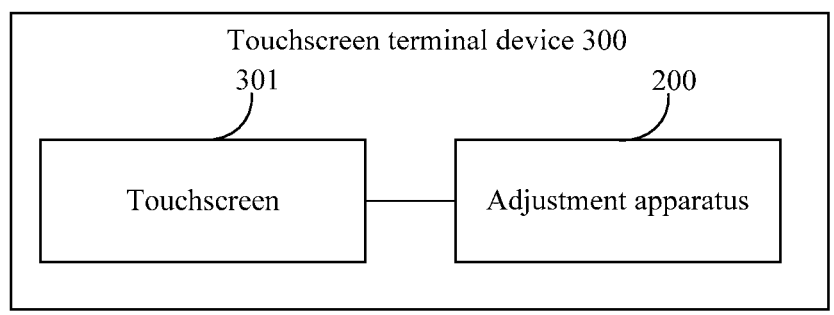
FIG. 14 is a schematic block diagram of a touchscreen terminal device according to an embodiment of the present invention.

FIG. 14 is a schematic block diagram of a touchscreen terminal device 300 according to an embodiment of the present invention. The terminal device 300 may be implemented as a touchscreen device such as a smartphone or a tablet computer. As shown in FIG. 14, the terminal device 300 includes a touchscreen 301 and the touch hotspot adjustment apparatus 200 according to any one of the foregoing embodiments of the present invention. The touchscreen 301 is connected to the adjustment apparatus 200 and configured to display application icons, receive touch actions, generate touch point coordinates of the touch actions, and send the touch point coordinates to the adjustment apparatus 200. The adjustment apparatus 200 is configured to implement the touch hotspot adjustment method according to any one of the foregoing embodiments of the present invention based on the touch point coordinates sent by the touchscreen.

Figure 15:
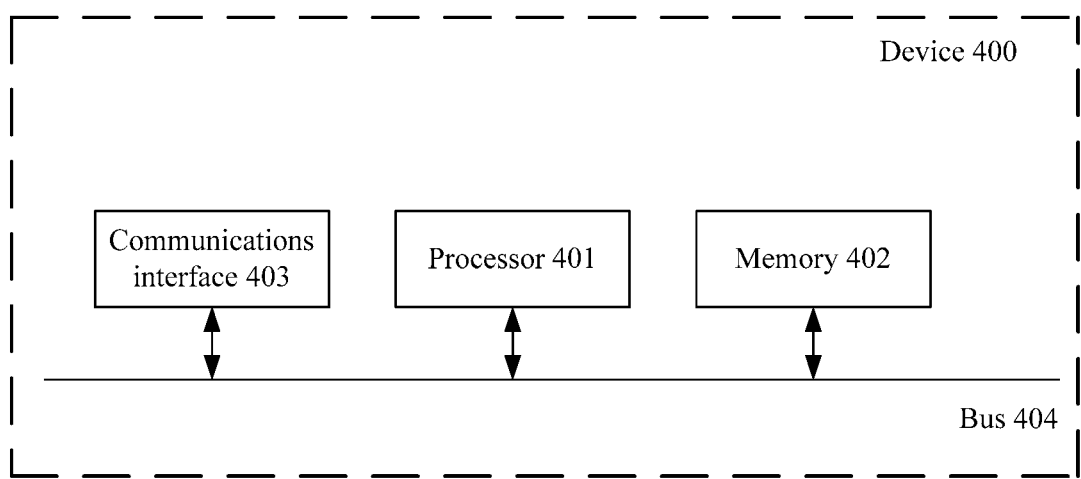
FIG. 15 is a schematic block diagram of a touch hotspot adjustment device according to an embodiment of the present invention.

FIG. 15 is a schematic block diagram of a touch hotspot adjustment device 400 according to an embodiment of the present invention. As shown in FIG. 15, the device 400 includes a processor 401, a memory 402, and a communications interface 403. The memory 402 is configured to store executable computer program code. The processor 401 reads the computer program code stored in the memory 402 to run a program corresponding to the executable program code, so as to implement the adjustment method according to any one of the foregoing embodiments of the present invention. The communications interface 403 is configured to communicate to an external device. The device 400 may further include a bus 404. The bus 404 is configured to connect the processor 401, the memory 402, and the communications interface 403, so that the processor 401, the memory 402, and the communications interface 403 communicate with each other through the bus 404.

An embodiment of the present invention also provides a computer-readable storage medium. The readable storage medium stores an instruction. When the instruction is run on a computer, the computer is enabled to execute the adjustment method according to any one of the foregoing embodiments of the present invention.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions in the embodiments of the present invention are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, through a coaxial cable, an optical fiber, or a digital subscriber line (DSL)) or wireless (for example, through infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

What is claimed is:

1. A touch hotspot adjustment method, executed by an electronic terminal, comprising:
    displaying an application icon through a touchscreen of the electronic terminal, the application icon having a link page associated therewith;
    detecting, based on user inputs through the touchscreen, a plurality of touch actions associated with the application icon in a time period, at least one of the touch actions activating the link page for display through the touch screen within the time period in addition to the display of the application icon;
    obtaining touch point coordinates of the touch actions;
    determining an effective coordinate point from the touch point coordinates, wherein the effective coordinate point is within a current hotspot of the application icon, and the link page is displayed within the time period for a time longer than a threshold in response to the touch action corresponding to the effective coordinate point;
    selecting, from the touch point coordinates, a deviated coordinate point associated with the application icon, wherein the deviated coordinate point is recorded before the effective coordinate point, the link page is not activated for display in response to the touch action corresponding to the deviated coordinate point, and a time difference between recording of the deviated coordinate point and recording of the effective coordinate point is less than a predetermined time difference; and
    adjusting the current hotspot of the application icon based on the deviated coordinate point to obtain a new hotspot of the application icon, wherein the new hotspot comprises the current hotspot.

2. The adjustment method according to claim 1, before the adjusting the current hotspot of the application icon based on the at least one deviated coordinate point of the application icon to obtain a new hotspot of the application icon, further comprising:
    determining that a distance between the at least one deviated coordinate point and the current hotspot is less than a predetermined distance.

3. The adjustment method according to claim 1, before the adjusting the current hotspot of the application icon based on the at least one deviated coordinate point of the application icon to obtain a new hotspot of the application icon, further comprising:
    determining that a quantity of the at least one effective coordinate point obtained within the at least one predetermined time period is larger than a predetermined value.

4. The adjustment method according to claim 1, wherein the adjusting the current hotspot of the application icon based on the at least one deviated coordinate point of the application icon to obtain a new hotspot of the application icon, comprises:
    connecting, according to a predefined rule, the at least one deviated coordinate point to the current hotspot of the application icon to obtain the new hotspot of the application icon.

5. The adjustment method according to claim 1, wherein, if a quantity of the at least one deviated coordinate point of the application icon is not less than three, the adjusting the current hotspot of the application icon based on the at least one deviated coordinate point of the application icon to obtain a new hotspot of the application icon comprises:
    connecting the at least one deviated coordinate point using one or more straight lines to obtain the largest region among all possible regions based on the at least one deviated coordinate point connected using the one or more straight lines; and
    obtaining the new hotspot of the application icon based on the largest region and the current hotspot of the application icon, wherein the new hotspot comprises the largest region and the current hotspot of the application icon.

6. The adjustment method according to claim 5, wherein the obtaining the new hotspot of the application icon based on the largest region and the current hotspot of the application icon comprises:
    combining the largest region and the current hotspot of the application icon; and
    setting the combination as the new hotspot of the application icon.

7. The adjustment method according to claim 1, after the adjusting the current hotspot of the application icon based on the at least one deviated coordinate point of the application icon to obtain a new hotspot of the application icon, further comprising:
    in response to the new hotspot exceeding a predetermined region, setting a region of the new hotspot that is within the predetermined region as the new hotspot of the application icon.

8. The adjustment method according to claim 1, further comprising:
    recording the touch point coordinates of touch actions more than one predetermine time period; and
    adjusting an original hotspot of the application icon based on the at least one deviated coordinate point of the application icon obtained in the more than one predetermined time period, to obtain the new hotspot of the application icon,
    wherein the original hotspot is defined at generation of the application icon.

9. The adjustment method according to claim 1, wherein, after the adjusting the current hotspot of the application icon based on the at least one deviated coordinate point of the application icon to obtain a new hotspot of the application icon, the method further comprises:
    in response to no effective coordinate point being obtained in a second predetermined time period, setting an original hotspot of the application icon as the new hotspot of the application icon, wherein the original hotspot is defined at generation of the application icon.

10. A non-transitory computer-readable storage medium storing computer-executable instructions, which, when executed by a processor, cause the processor to facilitate:
displaying an application icon through a touchscreen of the electronic terminal, the application icon having a link page associated therewith;
detecting, based on user inputs through the touchscreen, a plurality of touch actions associated with the application icon in a time period, at least one of the touch actions activating the link page for display through the touch screen within the time period in addition to the display of the application icon;
obtaining touch point coordinates of the touch actions;
determining an effective coordinate point from the touch point coordinates, wherein the effective coordinate point is within a current hotspot of the application icon, and the link page is displayed within the time period for a time longer than a threshold in response to the touch action corresponding to the effective coordinate point;
selecting, from the touch point coordinates, a deviated coordinate point associated with the application icon, wherein the deviated coordinate point is recorded before the effective coordinate point, the link page is not activated for display in response to the touch action corresponding to the deviated coordinate point, and a time difference between recording of the deviated coordinate point and recording of the effective coordinate point is less than a predetermined time difference; and
adjusting the current hotspot of the application icon based on the deviated coordinate point to obtain a new hotspot of the application icon, wherein the new hotspot comprises the current hotspot.

11. A terminal device, comprising:
a processor; and
a memory storing computer-executable instructions, which, when executed by the processor, cause the processor to facilitate:
displaying an application icon through a touchscreen of the electronic terminal, the application icon having a link page associated therewith;
detecting, based on user inputs through the touchscreen, a plurality of touch actions associated with the application icon in a time period, at least one of the touch actions activating the link page for display through the touch screen within the time period in addition to the display of the application icon;
obtaining touch point coordinates of the touch actions;
determining an effective coordinate point from the touch point coordinates, wherein the effective coordinate point is within a current hotspot of the application icon, and the link page is displayed within the time period for a time longer than a threshold in response to the touch action corresponding to the effective coordinate point;
selecting, from the touch point coordinates, a deviated coordinate point associated with the application icon, wherein the deviated coordinate point is recorded before the effective coordinate point, the link page is not activated for display in response to the touch action corresponding to the deviated coordinate point, and a time difference between recording of the deviated coordinate point and recording of the effective coordinate point is less than a predetermined time difference; and
adjusting the current hotspot of the application icon based on the deviated coordinate point to obtain a new hotspot of the application icon, wherein the new hotspot comprises the current hotspot.

12. The terminal device according to claim 11, before the adjusting the current hotspot of the application icon based on the at least one deviated coordinate point of the application icon to obtain a new hotspot of the application icon, the computer-executable instructions further causing the processor to facilitate:
determining that a distance between the at least one deviated coordinate point and the current hotspot is less than a predetermined distance.

13. The terminal device according to claim 11, before the adjusting the current hotspot of the application icon based on the at least one deviated coordinate point of the application icon to obtain a new hotspot of the application icon, the computer-executable instructions further causing the processor to facilitate:
determining that a quantity of the at least one effective coordinate point obtained within the at least one predetermined time period is larger than a predetermined value.

14. The terminal device according to claim 11, wherein the adjusting the current hotspot of the application icon based on the at least one deviated coordinate point of the application icon to obtain a new hotspot of the application icon further comprises:
connecting, according to a predefined rule the at least one deviated coordinate point to the current hotspot of the application icon to obtain the new hotspot of the application icon.

15. The terminal device according to claim 11, wherein, if a quantity of the at least one deviated coordinate point of the application icon is not less than three, the adjusting the current hotspot of the application icon based on the at least one deviated coordinate point of the application icon to obtain a new hotspot of the application icon comprises:
connecting the at least one deviated coordinates point using one or more straight lines to obtain the largest region among all possible regions based on the at least one deviated coordinate point connected using the one or more straight; and
obtaining the new hotspot of the application icon based on the largest region and the current hotspot of the application icon, wherein the new hotspot comprises the largest region and the current hotspot of the application icon.

16. The terminal device according to claim 15, wherein the obtaining the new hotspot of the application icon based on the largest region and the current hotspot of the application icon comprises:
combining the largest region and the current hotspot of the application icon; and
setting the combination as the new hotspot of the application icon.

17. The terminal device according to claim 11, after the adjusting the current hotspot of the application icon based on the least one deviated coordinate point of the application icon to obtain a new hotspot of the application icon, the computer-executable instructions further causing the processor to facilitate:
in response to the new hotspot exceeding a predetermined region, setting a region of the new hotspot that is within the predetermined region as the new hotspot of the application icon.

18. The terminal device according to claim 11, the computer-executable instructions further causing the processor to facilitate:

recording the touch point coordinates of touch actions more than one predetermine time period; and adjusting an original hotspot of the application icon based on the at least one deviated coordinate point of the application icon obtained in the more than one predetermined time periods, to obtain the new hotspot of the application icon, wherein the original hotspot is defined at generation of the application icon.

19. The terminal device according to claim 11, wherein, after the adjusting the current hotspot of the application icon based on the at least one deviated coordinate point of the application icon to obtain a new hotspot of the application icon, the method further comprises:

in response to effective coordinate point being obtained in a second predetermined time period, setting an original hotspot of the application icon as the new hotspot of the application icon, wherein the original hotspot is defined at generation of the application icon.

* * * * *